United States Statutory Invention Registration [19]

[11] Reg. Number: H532

Brandmayr

[43] Published: Oct. 4, 1988

[54] METHOD OF CHEMICALLY POLISHING FUSED QUARTZ

[75] Inventor: Ronald J. Brandmayr, Ocean, N.J.

[73] Assignee: The United States of America as represented by the Secretary of the Army, Washington, D.C.

[21] Appl. No.: 920,626

[22] Filed: Oct. 20, 1986

[51] Int. Cl.[4] ..... C03C 15/00

[52] U.S. Cl. ..... 156/636; 156/637; 156/663; 156/903; 252/79.3; 65/31

[58] Field of Search ..... 156/636, 637, 663, 903; 252/79.3; 65/31

[56] References Cited

U.S. PATENT DOCUMENTS

| | | | |
|---|---|---|---|
| 4,099,950 | 7/1978 | Pecoraro | 65/99.2 |
| 4,274,907 | 6/1981 | Vig et al. | 156/663 X |
| 4,555,304 | 11/1985 | Sälzle | 156/663 |

*Primary Examiner*—John F. Terapane
*Assistant Examiner*—Susan Wolffe
*Attorney, Agent, or Firm*—Sheldon Kanars; Roy E. Gordon

[57] ABSTRACT

Fused quartz is chemically polished by lapping the fused quartz surface to about 3 microns, thoroughly cleaning the lapped fused quartz, treating the lapped fused quartz with an etchant at high pressure in a high pressure vessel while agitating to circulate the etchant and maintaining a uniform temperature throughout the etchant, cooling the vessel, removing the fused quartz, rinsing thoroughly with water and spinning dry.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF CHEMICALLY POLISHING FUSED QUARTZ

The invention described herein may be manufactured, used, and licensed by or for the Government for governmental purposes, without the payment to me of any royalty thereon.

This invention relates in general to a method of chemically polishing fused quartz and in particular, to such a method wherein the chemically polished fused quartz will be suitable for use in electrical components having low electric loss, high temperature stability, high heat shock resistance and low thermal expansion.

The invention is copending with U.S. patent application Ser. No. 781,166 filed Sept. 30, 1985 by Ronald J. Brandmayr for "Method of Chemically Polishing Quartz Crystal Blanks" and assigned to a common assignee.

BACKGROUND OF THE INVENTION

In Ser. No. 781,166, there is disclosed and claimed a method of chemically polishing quartz crystal blanks involving treating the quartz crystal blanks with an etching solution at high pressure in a high pressure vessel. The Ser. No. 781,166 method, although desirable for treating a quartz crystal blank having piezoelectric properties and thus suitable for use in a crystal oscillator does not teach or suggest that the method could be usable for treating any other type of material such as for example, a fused quartz or glass type material that does not have piezoelectric properties.

In this connection, fused quartz or glass is not piezoelectric. It cannot be used in quartz crystal oscillators. It is not cut from a crystal and is not doubly rotated. Fused quartz has a random internal orientation.

Fused quartz has potential for use in electrical components having low electric loss, high temperature stability and high heat shock resistance and low thermal expansion. In such application, it would be desirable to improve device fabrication by removing surface damage such as microcracks from the surface or the fused quartz and polishing the surface of the fused quartz.

SUMMARY OF THE INVENTION

The general object of this invention is to provide a method of chemically polishing fused quartz. A more specific object of the invention is to provide such a method that enables one to remove surface damage such as microcracks from the surface of the fused quartz so that a good surface finish is obtained for device fabrication.

It has now been found that the aforementioned objects can be attained by applying the general teaching of Ser. No. 781,166 to the processing of fused quartz. That is, the method of the invention enables one to remove surface damage such as microcracks from the surface of the fused quartz.

More particularly, according to this invention, the surface of a sample of fused quartz is first lapped about 3 microns, the piece of fused quartz that has been lapped then thoroughly cleaned, and then treated with an etchant having an HF concentration of 4.50 to 4.66 moles per liter obtained by blending a 40 percent NH$\mu$F solution with a 49 percent HF solution, at high pressures in a high pressure vessel while agitating to circulate the etchant solution, the vessel then cooled, the fused quartz removed and then thoroughly rinsed with water and then, spun dry.

The method of the invention requires that the fused quartz sample be thoroughly cleaned prior to pressure polishing.

The high pressure vessel used in the invention must be inert to corrosive chemicals used to etch fused quartz. Such a vessel can conveniently be a teflon lined high pressure autoclave that has built in magnetic stirring. The stirring and agitation circulates the etchant and maintains a uniform temperature throughout the etching solution. The temperature can range from about 70 degrees C. to about 100 degrees C. with a temperature of 75 degrees C.preferred.

The gas pressure can be supplied by nitrogen or an inert gas. The pressure can be from about 350 psi to about 1,050 psi.

The pressure polishing can take about 1½ hours up to about 5 hours. The time of pressure polishing is determined from the rate of etching of the particular etchant and the desired depth of etching.

DESCRIPTION OF THE PREFERRED EMBODIMENT

Fused quartz is a glass and is not piezoelectric, as opposed to crystalline quartz which is piezoelectric and has application in quartz crystal oscillators. The fused quartz samples to be chemically polished are lapped about 3 microns and then thoroughly cleaned before processing. The lapped fused quartz is then mounted inside a teflon-lined high pressure autoclave. The autoclave is then filled with a hydrofluoric acid based etchant having an HF concentration of 4.50–4.66 moles per liter obtained by blending a 40 percent NH$\mu$F solution with a 49 percent HF solution. The autoclave is then sealed tight using a teflon gasket and steel clamps. A teflon-clad thermocouple is immersed in the etching solution through the cover, vacuum sealed, to measure temperature. The chamber is then filled with nitrogen to a pressure of about 350 p.s.i. The magnetic stirring is then turned on to circulate the etchant. The autoclave, which sits within a heating mantle, is heated to 75 degrees C. The fused quartz samples are then soaked at about 75 degrees C. for about 1½]hours while maintaining the pressure at about 350 psi to about 1,050 psi. The autoclave is then shut off and allowed to cool to 65 degrees C. in 20 minutes. The pressure is then released, the cover removed from the autoclave and the samples removed. The fused quartz is then thoroughly rinsed with water and spun dry. Fused quartz processed in this manner has a polished surface with a surface roughness of better than 0.09 micron.

Evaporation of etchant is a problem with the conventional method which causes the etch rate of the etchant to constantly change. The method of this invention eliminates evaporation of the etchant.

I wish it to be understood that I do not desire to be limited to the exact details as described, for obvious modifications will occur to a person skilled in the art.

What is claimed is:

1. Method of chemically polishing a fused quartz surface so that the fused quartz will be suitable for use in electrical components having low electric loss, high temperature stability, high heat shock resistance and low thermal expansion, said method including the steps of:

(a) lapping the fused quartze surface about 3 microns, (B) thoroughly cleaning the piece of fused quartz that has been lapped, (C) treating the fused quartz with an etchant having an HF concentration of 4.50 to 4.66 moles per liter obtained by blending a 40 percent NHμF solution with a 49 percent HF solution at high pressure from about 350 psi to about 1,050 psi in a high pressure vessel while agitating to circulate the etchant and maintaining uniform temperature througout the etching solution just long enough to polish the surface of the fused quartz, (D) cooling the vessel, (E) removing the fused quartz the then thoroughly rinsing the fused quartz with water, and (f) spinning dry.

2. Method according to claim 1 wherein the high pressure vessel is a teflon-lined high pressure autoclave.

3. Method according to claim 1 wherein the high pressure is provided by nitrogen gas.

4. Method according to claim 1 wherein the high pressure is provided by an inert gas.

5. Method according to claim 1 wherein the temperature is maintained at about 75 degrees C.

6. Method according to claim 1 wherein the etching time is from about 1.5 hours to as long as about 5 hours.

7. Method according to claim 2 wherein etchant is sealed in the chamber of the autoclave preventing evaportion of the etchane and maintaining a constant etch rate.

8. Method according to claim 1 wherein the fused quartz is chemically polished to a surface roughness of better than 0.09 micron.

* * * * *